US010531675B2

(12) United States Patent
Tan

(10) Patent No.: US 10,531,675 B2
(45) Date of Patent: Jan. 14, 2020

(54) CONTROLLING A ROASTING PROCESS OF COFFEE BEANS

(71) Applicant: KONINKLIJKE PHILIPS N.V., Eindhoven (NL)

(72) Inventor: Jingwei Tan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/021,417

(22) PCT Filed: Apr. 14, 2015

(86) PCT No.: PCT/EP2015/058005
§ 371 (c)(1),
(2) Date: Mar. 11, 2016

(87) PCT Pub. No.: WO2015/158678
PCT Pub. Date: Oct. 22, 2015

(65) Prior Publication Data
US 2017/0156362 A1    Jun. 8, 2017

(30) Foreign Application Priority Data

Apr. 15, 2014  (WO) ............... PCT/CN2014/075367
May 28, 2014  (EP) ................................ 14170144

(51) Int. Cl.
*A23F 5/04* (2006.01)
*A47J 42/52* (2006.01)
*A47J 31/42* (2006.01)

(52) U.S. Cl.
CPC .............. *A23F 5/04* (2013.01); *A47J 31/42* (2013.01); *A47J 42/52* (2013.01)

(58) Field of Classification Search
CPC ..... A23F 5/04; A23F 5/08; A23N 12/00; A47J 31/42
See application file for complete search history.

(56) References Cited

U.S. PATENT DOCUMENTS 4,072,765 A  *  2/1978  Scarsella .................. A23F 5/14
                                                            426/595
4,949,632 A      8/1990  Porzi
                         (Continued)

FOREIGN PATENT DOCUMENTS

CN       1278705 A      1/2001
DE    19645306 A1     11/1997
                     (Continued)

OTHER PUBLICATIONS

Mergili DE 19645306 machine translation 1997.*
(Continued)

*Primary Examiner* — Viren A Thakur
*Assistant Examiner* — Lela S. Williams
(74) *Attorney, Agent, or Firm* — Schott, P.C.

(57) ABSTRACT

The present invention proposes a method for controlling a roasting process of coffee beans comprises sampling a first batch of coffee beans and a second batch of coffee beans from said coffee beans during roasting (S12; S42); detecting a surface color of the first batch of coffee beans (S14; S44); grinding the second batch of coffee beans and detecting a powder color of the second batch of coffee beans after grinding (S16; S46); and controlling the roasting process at least partially based on the detected surface color of the first batch of coffee beans and the detected powder color of the first batch of coffee beans (S18; S48). The present invention also provides apparatus using the above described method.

19 Claims, 3 Drawing Sheets

(56) References Cited

U.S. PATENT DOCUMENTS

| | | | | |
|---|---|---|---|---|
| 5,526,437 A | * | 6/1996 | West | B07C 5/368 |
| | | | | 209/577 |
| 6,207,211 B1 | * | 3/2001 | Wasserman | A23F 5/04 |
| | | | | 426/466 |
| 2014/0106038 A1 | * | 4/2014 | Buschmann | A23F 5/04 |
| | | | | 426/296 |

FOREIGN PATENT DOCUMENTS

| | | |
|---|---|---|
| EP | 0446794 A1 | 9/1991 |
| JP | H04311349 A | 11/1992 |
| WO | 9923888 A1 | 5/1999 |
| WO | 2012059484 A2 | 5/2012 |

OTHER PUBLICATIONS 1. http://www.hunterlab.com/Instruments/Bench/UltraScanVIS.
Office Action issued in connection with corresponding 2015248963, dated Mar. 29, 2016, 2 pages.
Office Action issued in connection with corresponding 201580002043.6, dated Aug. 12, 2016, 7 pages.
Notice of Allowance issued in connection with corresponding 2016-536144, dated Jul. 19, 2017, 5 pages.

* cited by examiner

CONTROLLING A ROASTING PROCESS OF COFFEE BEANS

This application is the U.S. National Phase application under 35 U.S.C. § 371 of International Application No. PCT/EP2015/058005, filed on Apr. 14, 2014 and benefit of International Application No. PCT/CN2014/075367 filed on Apr. 15, 2014 and International Application No. 14170144.1 filed on May 28, 2014. These applications are hereby incorporated by reference herein.

FIELD OF THE INVENTION

The present invention relates to coffee beans roasting management, and particularly to a method and apparatus for controlling a roasting process of coffee beans.

BACKGROUND OF THE INVENTION

It will be appreciated that the roasting level of coffee beans can be determined during coffee roasting and further used to determine roasting process.

Traditionally, the coffee beans are roasted manually. The heating power and time are always predetermined. Sometimes, professionals monitor the surface colour change of the coffee beans during roasting process, then control or adjust coffee roasting profile (e.g. heating power, heating time, etc.) accordingly based on their professional experience. However, a lot people, especially those ordinary consumers, are always incapable of accurately and quantitatively determining the roasting profile. They don't know how to judge the roasting degree and how to adjust roasting profile according to real status. Thus, the roasting process would suffer from human errors (e.g. coffee bean over burn).

DE19645306 A1 discloses a device for controlling the roasting process for roasting coffee automatically, in particular for measuring the color value of coffee beans located in the roaster. It comprises an optical access in the roaster allowing to window in a sight glass, and an evaluation device for the control of the coffee roasting based on the measured color value of the roasted coffee, and to terminate automatically the roasting process on reaching a preselected roasting degree of coffee.

Either for professionals or for a device with an optical access to measure the color value of the roasted coffee beans, it is not easy to determine the right roasting profile during roasting process. Although it is known that surface colour of coffee beans is an important indicator to determine the roasting level of coffee beans, as the surface colour becomes darker during roasting, only surface colour itself is still not sufficient to determine the roasting degree. Coffee beans with same surface colour may provide different final taste to consumer, because coffee beans with same surface colour may have different colour of inner part due to different bean type or roasting profile.

In view of the foregoing, there is a need to provide a more accurate and automatic solution for controlling a roasting process of coffee beans.

SUMMARY OF THE INVENTION

In order to address the above and other potential problems, embodiments of the present invention propose a method, apparatus, and a coffee machine for controlling a roasting process of coffee beans.

In one aspect, a method for controlling a roasting process of coffee beans comprises sampling a first batch of coffee beans and a second batch of coffee beans from said coffee beans during roasting; detecting a surface colour of the first batch of coffee beans; grinding the second batch of coffee beans and detecting a powder colour of the second batch of coffee beans after grinding; and controlling the roasting process at least partially based on the detected surface colour of the first batch of coffee beans and the detected powder colour of the second batch of coffee beans. In accordance with embodiments of the present invention, the roasting profile can be adjusted based on the status of coffee beans during roasting process automatically, thereby avoiding any destruction. Furthermore, the roasting process is controlled with high accuracy and limited user effort.

Advantageously, the step of controlling further comprises determining the roasting degree of the coffee beans at least partially based on the detected surface colour of the first batch of coffee beans and the detected powder colour of the second batch of coffee beans; and controlling the roasting process at least partially based on the determined roasting degree of the coffee beans. By determining the roasting degree of the coffee beans, the roasting process can be well controlled.

Advantageously, the step of controlling further comprises controlling the roasting process based on the determined roasting degree of the coffee beans and predetermined final roasting degree of the coffee beans. This will allow consumers to preset the favorite roasting degree of coffee beans before roasting process. With more provided options of personalized roasting degrees, customers can get desired coffee taste and flavor without manual control.

Advantageously, the step of determining further comprises determining the roasting degree of the coffee beans based on the detected surface colour of the first batch of coffee beans, the detected powder colour of the second batch of coffee beans and a predefined prediction model, wherein the predefined prediction model is based on a calibration algorithm. By calibration in determining the roasting degree of the coffee beans, more accurate control may be achieved during the roasting process.

Advantageously, the above stated method further comprises repeating the steps of sampling, detecting, grinding and controlling until predetermined final roasting degree is obtained; wherein the step of sampling is performed in predetermined frequencies during the whole roasting process, and the predetermined frequencies vary in different roasting phases. By repeating the steps of sampling through controlling and by sampling in predetermined frequencies, more accurate control may be achieved during the roasting process.

Advantageously, the step of sampling is performed in a first predetermined frequency before the beginning of the first cracking of coffee beans and in a second predetermined frequency after the ending of the first cracking of coffee beans, and wherein the second predetermined frequency is higher than the first predetermined frequency. The roasting degree of coffee beans will change more rapidly after first crack. With higher sample size after first cracking, the roasting process can be controlled more timely and accurately.

Advantageously, said first batch of coffee beans comprises at least part of the second batch of coffee beans. That is to say, the coffee beans for detection of surface colour and the coffee beans for detection of powder colour may come from the same batch of coffee bean samples. For example, the coffee beans can be used to detect surface colour first. After that, the same batch of coffee beans can be ground and these coffee ground can be used to detect the powder colour.

It will simplify the process of sampling and reduce the interrupt of the roasting of most coffee beans.

Advantageously, the step of sampling comprises sampling the first batch of coffee beans and the second batch of coffee beans from said coffee beans simultaneously; stopping heating the first batch of coffee beans and the second batch of coffee beans. In accordance with the embodiments, the roasting degree of the coffee beans sampled for surface colour detection and powder colour detection are the same. Thus, the discrepancy between samples due to time difference is eliminated, which make the controlling more accurate.

Advantageously, said coffee beans are raw coffee beans or partially roasted beans.

In another aspect, embodiments of the present invention provide an apparatus for controlling a roasting process of coffee beans. The apparatus comprises a sampling unit, configured to sample a first batch of coffee beans and a second batch of coffee beans from said coffee beans during roasting; a grinding unit, configured to grind the second batch of coffee beans; a detection unit, configured to detect surface colour of the first batch of coffee beans, and to detect powder colour of the second batch of coffee beans after grinding, respectively; and a control unit, configured to control the roasting process at least partially based on the detected surface colour of the first batch of coffee beans and the detected powder colour of the second batch of coffee beans. In present invention, said roasting management using the surface colour and powder colour of the coffee beans detected in real time may cause the roasting level of coffee beans to be accurately controlled which may be helpful to obtain desired coffee taste and flavor.

In another aspect, embodiments of the present invention provide a coffee machine. The coffee machine comprises a roasting unit, configured to heat the coffee beans accommodated in a roasting chamber of the coffee machine; a sampling unit, configured to sample a first batch of coffee beans and a second batch of coffee beans from said coffee beans during roasting; a grinding unit, configured to grind the second batch of coffee beans; a detection unit, configured to detect surface colour of the first batch of coffee beans, and to detect powder colour of the second batch of coffee beans after grinding, respectively; and a control unit, electrically coupled to the detection unit and the roasting unit respectively, and configured to control the roasting process at least partially based on the detected surface colour of the first batch of coffee beans and the detected powder colour of the second batch of coffee beans. In present invention, said roasting management using the surface colour and powder colour of the coffee beans detected in real time may cause the roasting level of coffee beans to be accurately controlled which may be helpful to obtain desired coffee taste and flavor.

Other features and advantages of embodiments of the present invention will also be understood from the following description of exemplary embodiments when read in conjunction with the accompanying drawings, which illustrate, by way of example, spirit and principles of the present invention.

BRIEF DESCRIPTION OF THE DRAWINGS

The above and other objects and features of the present invention will become more apparent from the following detailed description considered in connection with the accompanying drawings, in which.

DETAILED DESCRIPTION OF EMBODIMENTS

Reference will now be made to embodiments of the invention, one or more examples of which are illustrated in the figures. The embodiments are provided by way of explanation of the invention, and are not meant as a limitation of the invention. For example, features illustrated or described as part of one embodiment may be used with another embodiment to yield still a further embodiment. It is intended that the invention encompass these and other modifications and variations as come within the scope and spirit of the invention.

In the present disclosure, the term of "first cracking" means an important phase during coffee roasting that an intensive chemical reaction occurs which results in greater amount of gases generated within coffee beans. Because of the pressure, coffee beans will expand, spit open with the escaping of the gases, audible sound and cracking will occur. First cracking phase usually lasts several minutes for a batch of coffee beans, as different coffee beans may crack at different time points. At the beginning, only a few coffee beans pop and expand, so the cracking sound is tiny and sparse. Later, there will be intensive first crackings and then it fades down to the end of first cracking. Normally, after the ending of the first cracking, coffee beans are drinkable. When to stop the roasting process depends on the expected roasting degree or preferred coffee taste.

Figure 1:
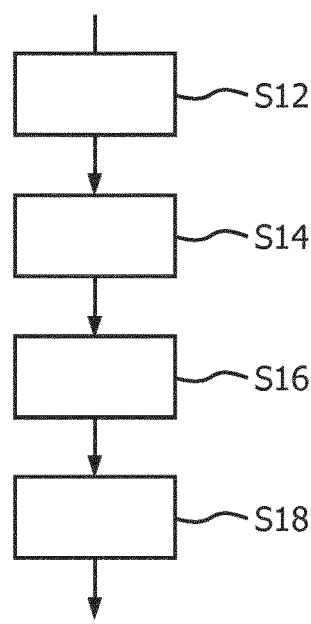
FIG. 1 is a flowchart of a method for controlling a roasting process of coffee beans according to one embodiment of the present invention.
Figure 2:
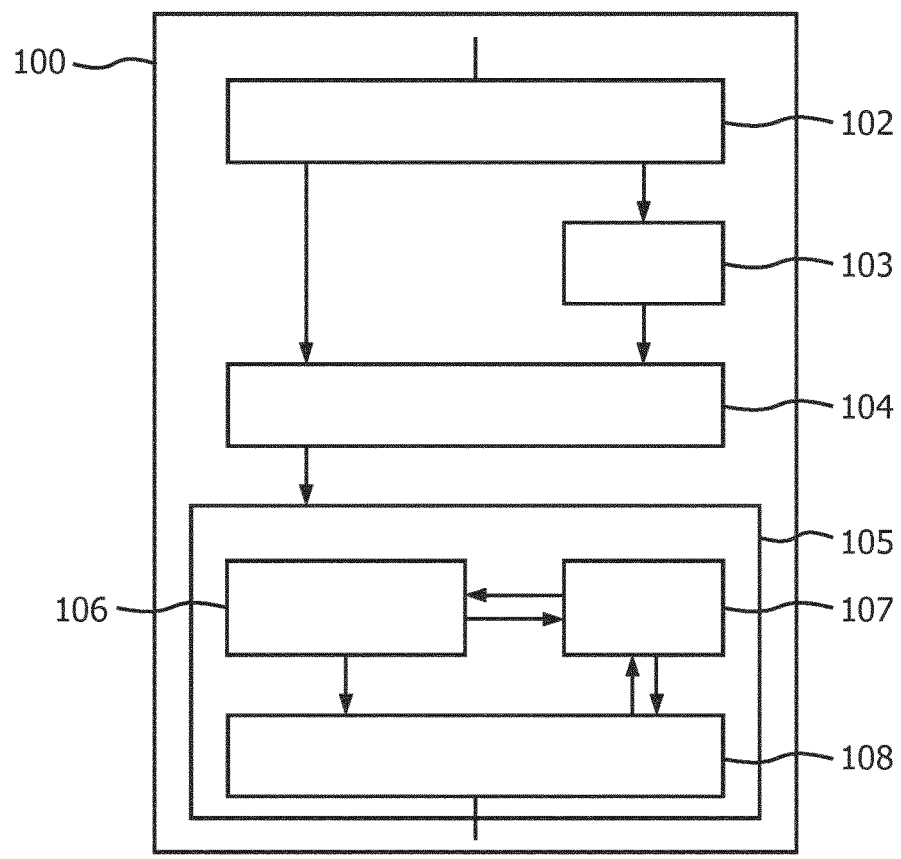
FIG. 2 shows a block diagram of an apparatus for controlling a roasting process of coffee beans according to one embodiment of the present invention.

FIG. 1 is a flowchart of a method for controlling a roasting process of coffee beans according to one embodiment of the present invention. FIG. 2 illustrates an apparatus 100 for controlling a roasting process of coffee beans that is configured to perform the method illustrated in FIG. 1.

Referring to FIG. 1, the method comprises a step S12 of sampling a first batch of coffee beans and a second batch of coffee beans from said coffee beans during roasting; a step S14 of detecting a surface colour of the first batch of coffee beans; a step S16 of grinding the second batch of coffee beans and detecting a powder colour of the second batch of coffee beans after grinding; and a step S18 of controlling the roasting process at least partially based on the detected surface colour of the first batch of coffee beans and the detected powder colour of the second batch of coffee beans, wherein the first batch and the second batch are sampled simultaneously or sequentially. For example, the second batch to be grinded for detection of powder colour is sampled first, and the first batch is sampled after the second batch of coffee beans are grinded or detected to reduce the detection deviation. In an alternative embodiment, a first batch of coffee beans and a second batch of coffee beans are sampled at the same time during roasting. The coffee beans are sampled together, and then divided into two batches. The advantage of this embodiment is that the roasting degrees of the two batches of coffee beans are exactly the same, because the roasting times of the coffee beans are the same. Thus the accuracy of this control method is improved.

The step S18 of controlling may further comprise determining the roasting degree of the coffee beans at least partially based on the detected surface colour of the first batch of coffee beans and the detected powder colour of the second batch of coffee beans; and controlling the roasting process at least partially based on the determined roasting degree of the coffee beans. Furthermore, in step S18, other parameters like coffee bean type, weight of coffee bean type can also be used to determine the roasting degree of the coffee beans. Advantageously, the step S18 of controlling further comprises controlling the roasting process based on the determined roasting degree of the coffee beans and predetermined final roasting degree of the coffee beans. Roasting degree is an important parameter for coffee bean roasting, because it closely links to final taste and flavor of beverage made by coffee bean. With the determined roasting degree, roasting profile including at least one of heating power, heating time, can be adjusted accordingly to real status of the coffee beans. It helps to provide coffee beans with more favorable final roasting degrees.

The substep of determining further comprises determining the roasting degree of the coffee beans based on the detected surface colour of the first batch of coffee beans, the detected powder colour of the second batch of coffee beans and a predefined prediction model, wherein the predefined prediction model is based on a calibration algorithm. That is, in this step, a deviation algorithm is applied to the detected surface color and powder colour of coffee beans. For instance, before the beginning of the first cracking, the value of surface color of coffee beans could be added by 0.2 to reflect the delay by the detection, while for the powder colour remains the same; for during the first cracking, powder color of coffee beans is added by 0.2, while bean surface color is added by 0.2; after the ending of the first cracking, both of the surface colour and the powder colour is added by 0.3. By calibration in determining the roasting degree of the coffee beans, more accurate control is achieved during the roasting process.

The above stated method may further comprise repeating the steps of sampling, detecting, grinding and controlling until predetermined final roasting degree is obtained; wherein the step S12 of sampling is performed in predetermined frequencies during the whole roasting process, and the predetermined frequencies vary in different roasting phases. For example, the step S12 of sampling is performed in a first predetermined frequency before the beginning of the first cracking of coffee beans and in a second predetermined frequency after the ending of the first cracking of coffee beans, and wherein the second predetermined frequency is higher than the first predetermined frequency. The roasting degree of coffee beans usually changes much quickly after the first crack. In view of the quick change of roasting degree, higher sampling frequency ensures timely data collection and process control. On the other hand, lower sampling frequency helps to save the energy and reduce the impact of the main coffee bean roasting process.

Advantageously, said first batch of coffee beans comprises at least part of the second batch of coffee beans. That is to say, the coffee beans for detection of surface colour and the coffee beans for detection of powder colour may come from the same batch of coffee bean samples. For example, the coffee beans can be used to detect surface colour first. After that, the same batch of coffee beans can be ground and these coffee ground can be used to detect the powder colour. By implementing this method, less coffee bean sample for detection color is required. Thus, it saves the cost on coffee beans and avoids waste.

In another example, the step S12 of sampling comprises sampling the first batch of coffee beans and the second batch of coffee beans from said coffee beans simultaneously; stopping heating the first batch of coffee beans and the second batch of coffee beans.

Advantageously, said coffee beans are raw coffee beans or partially roasted beans.

Referring to FIG. 2, the apparatus 100 comprises a sampling unit 102 which is attached to a container of the apparatus 100, and is configured to sample a first batch of coffee beans and a second batch of coffee beans from said coffee beans during roasting, wherein the first batch and the second batch are sampled simultaneously or sequentially, for example, the second batch to be grinded for detection of powder colour is sampled first, and the first batch is sampled after the second batch of coffee beans are grinded or detected to reduce the detection deviation. The apparatus 100 further comprises a detection unit 104 which is mechanically connected to the sampling unit 102 and a grinding unit 103 respectively, wherein the grinding unit 103 is connected to the sampling unit 102 and is configured to grind the second batch of coffee beans, and the detection unit 104 is configured to detect surface colour of the first batch of coffee beans and powder colour of the second batch of coffee beans after grinding, respectively.

The apparatus 100 further comprises a control unit 105 which is electrically connected to the detection unit 104 and configured to control the roasting process at least partially based on the detected surface colour of the first batch of coffee beans and the detected powder colour of the second batch of coffee beans. Advantageously, the control unit 105 comprises an analysis unit 106 which is electrically connected to the detection unit 104 and is configured to determine the roasting degree of the coffee beans at least partially based on the detected surface colour of the first batch of coffee beans and the detected powder colour of the second batch of coffee beans, and a controller 108 which is electrically connected to the analysis unit 106 and is configured to control the roasting process of the apparatus 100 at least partially based on the determined roasting degree of the coffee beans.

In one embodiment, the analysis unit 106 is linked with a data base 107 of Taste and Flavor Preferences that is linked to the values of both surface colour and powder colour of coffee beans, or linked to the values of either the surface colour or the powder colour and then the difference of the two colours. For instance, the roasting target is to have the surface colour of coffee beans to Medium Roast (with colour around 38), while the difference of powder colour value to it will be around one of these values: 0, +1, +2, >+2, −1, −2, <−2 as shown in Table 3. It is noted that, when the surface colour is selected, the taste and flavor of coffee depends on the difference selected. It is noted that, in the present embodiment, the colour measuring is performed by the colour detection instrument from HunterLab.

TABLE 3

Taste and Flavor Preference Table

| | | | | | | | |
|---|---|---|---|---|---|---|---|
| Light Roast | Surface colour | | | 40 or above | | | |
| Medium Roast | Surface colour | | | 39, 38, 37 | | | |
| Dark Roast | Surface colour | | | 36 or less | | | |
| | Difference between surface colour and powder colour | <−2 | −2 | −1 | +0 | +1 | +2 | >+2 |
| | Core of the bean | (Very darker) | (much darker) | (darker) | (same colour) | (lighter) | (more lighter) | (very lighter) |

In another embodiment, the controller 108 is also linked with the data base 107, and said controlling operation performed by the controller 108 controls the roasting process based on the determined roasting degree of the coffee beans and predetermined final roasting degree of the coffee beans, wherein the predetermined final roasting degree of the coffee beans is corresponding to a final surface colour and a final powder colour of coffee beans that are linked with a final targeted taste and flavor preference initially set by the custom. This allows for providing more personalized roasting degree to satisfy customs with desired coffee taste and flavor.

Advantageously, the roasted coffee bean which is perfect roasted (might be roasted by professional roaster, etc.) is selected as a roasting target. Its surface colour and powder colour are used as targeted surface colour and powder colour for future.

In one embodiment, said sampling unit 102 is configured to repeatedly sample the first batch of coffee beans and the second batch of coffee beans from said coffee beans in predetermined frequencies during the whole roasting process, and the predetermined frequencies vary in different roasting phases. For instance, the roasting phases comprise three phases, like before the beginning of the first cracking of coffee beans, during the first cracking, and after the ending of the first cracking. The sampling frequency could be roasting phase based, for example: before the beginning of the first cracking, sampling once every 2 minutes; entering the first cracking, sampling once every 1 minute; after the ending of the first cracking: sampling once every 20 seconds. Preferably, the sampling frequency after the ending of the first cracking is higher than the sampling frequency before, so that over roasting of the coffee beans is well avoided during the roasting process. It is noted that, since sampling can be performed for several times, detecting, grinding, determining and controlling can be performed for several times accordingly until the predetermined final roasting degree is obtained.

Advantageously, the analysis unit 106 is configured to determine the roasting degree of the coffee beans based on the detected surface colour of the first batch of coffee beans, the detected powder colour of the second batch of coffee beans and a predefined prediction model, and the predefined prediction model is based on a calibration algorithm.

Figure 3:
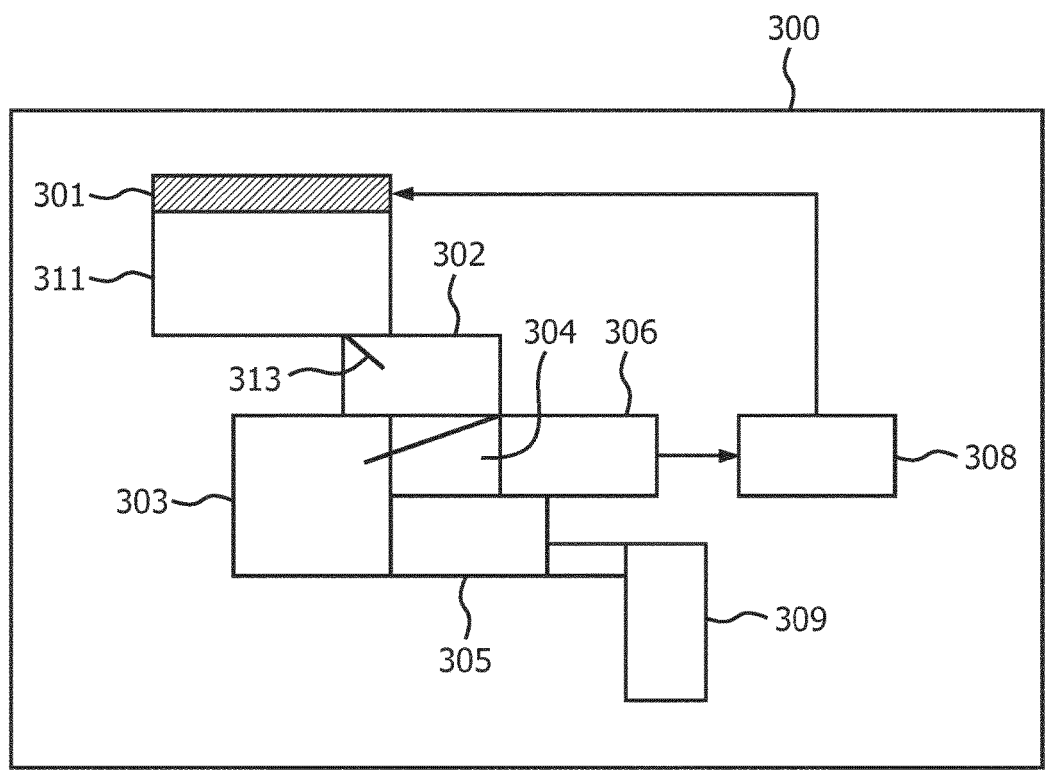
FIG. 3 shows a block diagram of a coffee machine according to one embodiment of the present invention.

FIG. 3 illustrates a coffee machine 300 according to one embodiment of the present invention. The coffee machine 300 comprises a roasting unit 301 configured to heat the coffee beans accommodated in a roasting chamber 311 of the coffee machine; a sampling unit 302 configured to sample a first batch of coffee beans and a second batch of coffee beans from said coffee beans during roasting; a grinding unit 303 configured to grind the second batch of coffee beans; a detection unit 304 configured to detect surface colour of the first batch of coffee beans, and to detect powder colour of the second batch of coffee beans after grinding, respectively; and a control unit 306 and 308, electrically coupled to the detection unit 304 and the roasting unit 301 respectively, and configured to control the roasting process at least partially based on the detected surface colour of the first batch of coffee beans and the detected powder colour of the second batch of coffee beans.

Advantageously, the control unit 306 and 308 comprises an analysis unit 306, electrically coupled to the detection unit 304 and configured to determine the roasting degree of the coffee beans at least partially based on the detected surface colour of the first batch of coffee beans and the detected powder colour of the second batch of coffee beans; and a controller 308 which is electrically connected to the analysis unit 106 and is configured to control the roasting process at least partially based on the determined roasting degree of the coffee beans.

It is noted that the roasting by the roasting unit 301 is a heat transformation process. To make the inner part of the coffee bean lighter, quickly heat the surface of the bean with high temperature and then lower down the heat by ventilation or other cooling, thus, the inner part of the bean will not contain much heat, and hence the colour will go darker much slower than the surface, vice versa.

In one embodiment, the controller 308 is configured to control the heating temperature, the time, the cooling or ventilation to make more accurate roasting profile for the required target.

In another embodiment, the sampling unit 303 is configured to comprise a shutter 313 which is attached to the roasting chamber 311 of the coffee machine 300. When the sampling unit 303 performs a sampling operation, the first and second batches of coffee beans will enter into a bean chamber of the sampling unit 302.

In still another embodiment, the coffee machine further comprises a coffee particle chamber 305 and a water tank and brewing unit 309 communicated with the coffee particle chamber 305 and configured to provide a brewed coffee.

Figure 4:
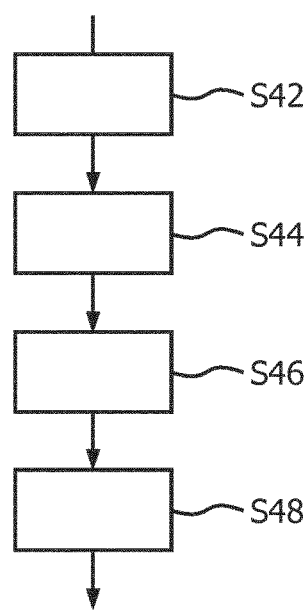
FIG. 4 shows a flowchart of a method for controlling a roasting process of coffee beans according to another embodiment of the present invention.
Figure 5:
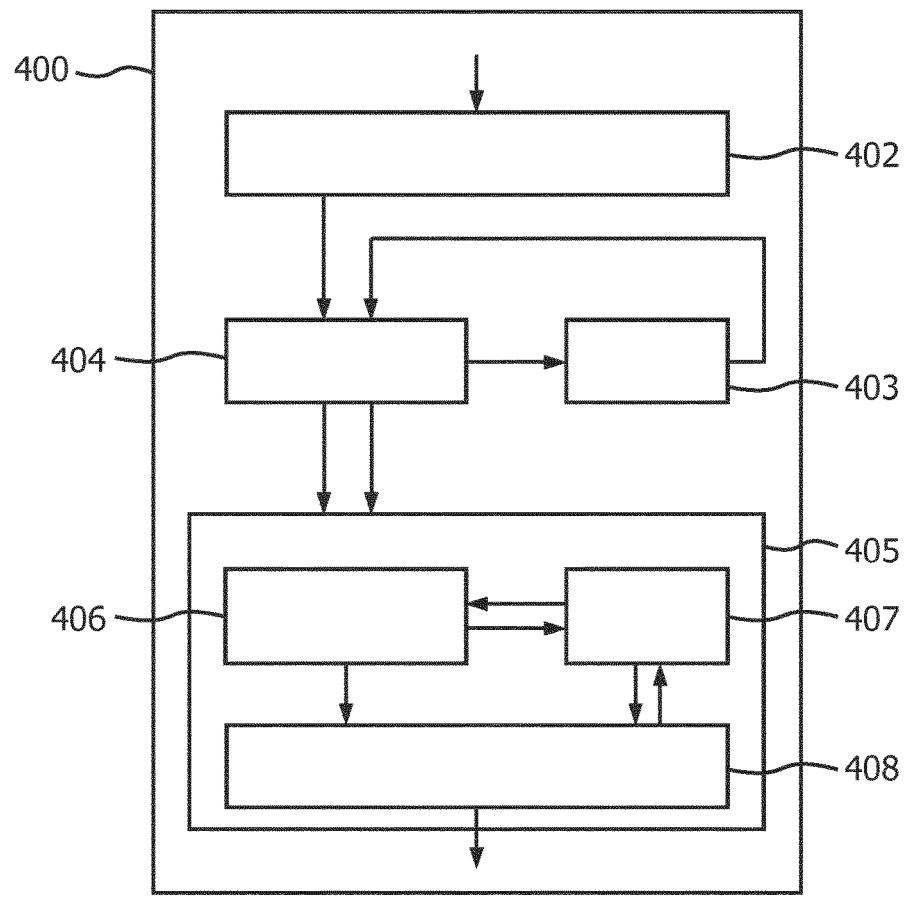
FIG. 5 shows a block diagram of an apparatus for controlling a roasting process of coffee beans according to another embodiment of the present invention.

FIG. 4 is a flowchart of a method for controlling a roasting process of coffee beans according to another embodiment of the present invention. FIG. 5 illustrates an apparatus 400 for controlling a roasting process of coffee beans that is configured to perform the method illustrated in FIG. 4.

Referring to FIG. 4, the method in this embodiment comprises a step S42 of sampling a first batch of coffee beans and a second batch of coffee beans from said coffee beans during roasting; a step S44 of detecting surface colour of the first batch of coffee beans; a step S46 of grinding the second batch of coffee beans and detecting powder colour of the second batch of coffee beans after grinding; and a step S48 of controlling the roasting process at least partially based on the detected surface colour of the first batch of coffee beans and the detected powder colour of the second batch of coffee beans, wherein in this embodiment the first batch of coffee beans comprise at least part of the second batch of coffee beans, that is, said second batch is from the first batch, or said first and second batches are the same.

Referring to FIG. 5, the apparatus 400 in this embodiment comprises a sampling unit 402 which is attached to a container of the apparatus 400, and is configured to sample a first batch of coffee beans and a second batch of coffee beans from said coffee beans during roasting, wherein the first batch of coffee beans comprise at least part of the second batch of coffee beans. That is, said second batch is from the first batch, or said first and second batches are the same.

The apparatus 400 further comprises a detection unit 404 is mechanically connected to the sampling unit 402 and a grinding unit 403 respectively, wherein the grinding unit 403 is connected to the sampling unit 402 and is configured to grind the second batch of coffee beans, and the detection unit 404 is configured to detect surface colour of the first batch of coffee beans and powder colour of the second batch of coffee beans after grinding, respectively.

The apparatus 400 further comprises a control unit 405 which is electrically connected to the detection unit 104 and configured to control the roasting process at least partially based on the detected surface colour of the first batch of coffee beans and the detected powder colour of the second batch of coffee beans. Advantageously, the control unit 405 comprises an analysis unit 406 which is electrically connected to the detection unit 404 and is configured to determine the roasting degree of the coffee beans at least partially based on the detected surface colour of the first batch of coffee beans and the detected powder colour of the second batch of coffee beans, and a controller 408 which is electrically connected to the analysis unit 406 and is configured to control the roasting process of the apparatus 400 at least partially based on the determined roasting degree of the coffee beans.

In one embodiment, the analysis unit 406 is linked with a data base 407 of Taste and Flavor Preferences that is linked to the values of both surface colour and powder colour of coffee beans, or linked to the values of either the surface colour or the powder colour and then the difference of the two colours.

In another embodiment, the controller 408 is also be linked with the data base 407, and said controlling operation performed by the controller 408 controls the roasting process based on the determined roasting degree of the coffee beans and predetermined final roasting degree of the coffee beans, wherein the predetermined final roasting degree of the coffee beans is corresponding to a final surface colour and a final powder colour of coffee beans that are linked with a final targeted taste and flavor preference initially set by the custom.

In various embodiments of the present invention, said coffee beans are raw coffee beans or partially roasted beans. This provides customs with various options of coffee beans. Certainly, if it is partially roasted bean (e.g. coarse ground), the surface colour of the partially roasted bean and its powder colour are also be convenient and helpful as initial data for the final roasting strategy making. For instance, the control unit makes, before starting roasting, a roasting strategy at least based on the initial surface colour and powder colour of the partially roasted beans.

In various embodiments of the present invention, the grinding unit is configured to just mesh the coffee beans to a few particles which do not need to be very fine, and the detection unit is configured as a colour sensor.

In various embodiments of the present invention, the control unit is configured to control the grinding and brewing processes of the coffee machine by the detection unit detecting the colour surface and powder colour of the coffee beans so as to adjust the proper brewing methods by taking grinding particle size, water/coffee dosage ratio, water temperature regarding to time, flow-rate of water, brewing duration, pre-brewing or not, into consideration.

In various embodiments of the present invention, the control unit is configured to consider the surface colour and powder colour of the coffee beans as a reference for next roasting.

In various embodiments of the present invention, heating mechanism adopted by said roasting unit can be induction heating, light-wave heating, heating plate/spring, or other possible means that may be configured to increase temperature of coffee materials.

In various embodiments, coffee machines in the present invention may further comprise a thermometer (not shown) configured to measure the heating temperature of the coffee beans.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for controlling a roasting process of coffee beans, the method comprising steps of:
   sampling a first batch of coffee beans and a second batch of coffee beans from said coffee beans during roasting;
   detecting a surface colour of the first batch of coffee beans;
   grinding the second batch of coffee beans and detecting a powder colour of the second batch of coffee beans after grinding; and
   controlling the roasting process at least partially based on the detected surface colour of the first batch of coffee beans and the detected powder colour of the second batch of coffee beans.

2. The method of claim 1, wherein the step of controlling further comprising:
   determining a roasting degree of the coffee beans at least partially based on the detected surface colour of the first batch of coffee beans and the detected powder colour of the second batch of coffee beans; and
   controlling the roasting process at least partially based on the determined roasting degree of the coffee beans.

3. The method of claim 2, wherein the step of controlling further comprising:
   controlling the roasting process based on the determined roasting degree of the coffee beans and a predetermined final roasting degree of the coffee beans.

4. The method of claim 2, wherein the step of determining further comprising:
   determining the roasting degree of the coffee beans based on the detected surface colour of the first batch of coffee beans, the detected powder colour of the second batch of coffee beans and a predefined prediction model, wherein the predefined prediction model is based on a calibration algorithm.

5. The method of claim 1, further comprising:
repeating the steps of sampling, detecting, grinding, and controlling until a predetermined final roasting degree of the coffee beans is obtained,
wherein the step of sampling is performed in predetermined frequencies during whole of the roasting process, and the predetermined frequencies vary in different roasting phases.

6. The method of claim 5, wherein the step of sampling is performed in a first predetermined frequency, of the predetermined frequencies, before beginning of a first cracking of coffee beans and in a second predetermined frequency, of the predetermined frequencies, after ending of the first cracking of coffee beans, and wherein the second predetermined frequency is higher than the first predetermined frequency.

7. The method of claim 1, wherein the first batch of coffee beans comprises at least part of the second batch of coffee beans.

8. The method of claim 1, wherein the step of sampling comprises:
sampling the first batch of coffee beans and the second batch of coffee beans from said coffee beans simultaneously; and
stopping heating the first batch of coffee beans and the second batch of coffee beans.

9. The method of claim 1, wherein the coffee beans are raw coffee beans or partially roasted beans.

10. An apparatus for controlling a roasting process of coffee beans, the apparatus comprising:
a sampling unit which samples a first batch of coffee beans and a second batch of coffee beans from said coffee beans during roasting;
a grinding unit which grinds the second batch of coffee beans;
a detection unit which detects surface colour of the first batch of coffee beans, and detects powder colour of the second batch of coffee beans after grinding, respectively; and
a control unit which controls the roasting process at least partially based on the detected surface colour of the first batch of coffee beans and the detected powder colour of the second batch of coffee beans.

11. The apparatus of claim 10, wherein said sampling unit repeatedly samples the first batch of coffee beans and the second batch of coffee beans from said coffee beans in predetermined frequencies during whole of the roasting process, and the predetermined frequencies vary in different roasting phases.

12. The apparatus of claim 11, wherein said sampling unit samples the first batch of coffee beans and the second batch of coffee beans from said coffee beans in a first predetermined frequency, of the predetermined frequencies, before beginning of a first cracking of coffee beans and in a second predetermined frequency, of the predetermined frequencies, after ending of the first cracking of coffee beans, and
wherein the second predetermined frequency is higher than the first predetermined frequency.

13. The apparatus of claim 10, wherein the control unit includes:
an analysis unit which determines a roasting degree of the coffee beans at least partially based on the detected surface colour of the first batch of coffee beans and the detected powder colour of the second batch of coffee beans, and a
controller which controls the roasting process at least partially based on the determined roasting degree of the coffee beans.

14. The apparatus of claim 10, wherein the first batch of coffee beans comprises at least part of the second batch of coffee beans.

15. A coffee machine for providing brewed coffee comprising the apparatus of claim 10.

16. The coffee machine of claim 15, wherein said sampling unit repeatedly samples the first batch of coffee beans and the second batch of coffee beans from said coffee beans in predetermined frequencies during whole of the roasting process, and the predetermined frequencies vary in different roasting phases.

17. The coffee machine of claim 16, wherein said sampling unit samples the first batch of coffee beans and the second hatch of coffee beans from said coffee beans in a first predetermined frequency, of the predetermined frequencies, before beginning of a first cracking of coffee beans and in a second predetermined frequency, of predetermined frequencies, after ending of the first cracking of coffee beans, and
wherein the second predetermined frequency is higher than the first predetermined frequency.

18. The coffee machine of claim 15, wherein the control unit includes:
an analysis unit which determines a roasting degree of the coffee beans at least partially based on the detected surface colour of the first batch of coffee beans and the detected powder colour of the second batch of coffee beans, and a
controller which controls the roasting process at least partially based on the determined roasting degree of the coffee beans.

19. The coffee machine of claim 15, wherein the first batch of coffee beans comprises at least part of the second batch of coffee beans.

* * * * *